Nov. 26, 1935.   V. W. KLIESRATH   2,022,041
WHEEL
Filed April 29, 1932
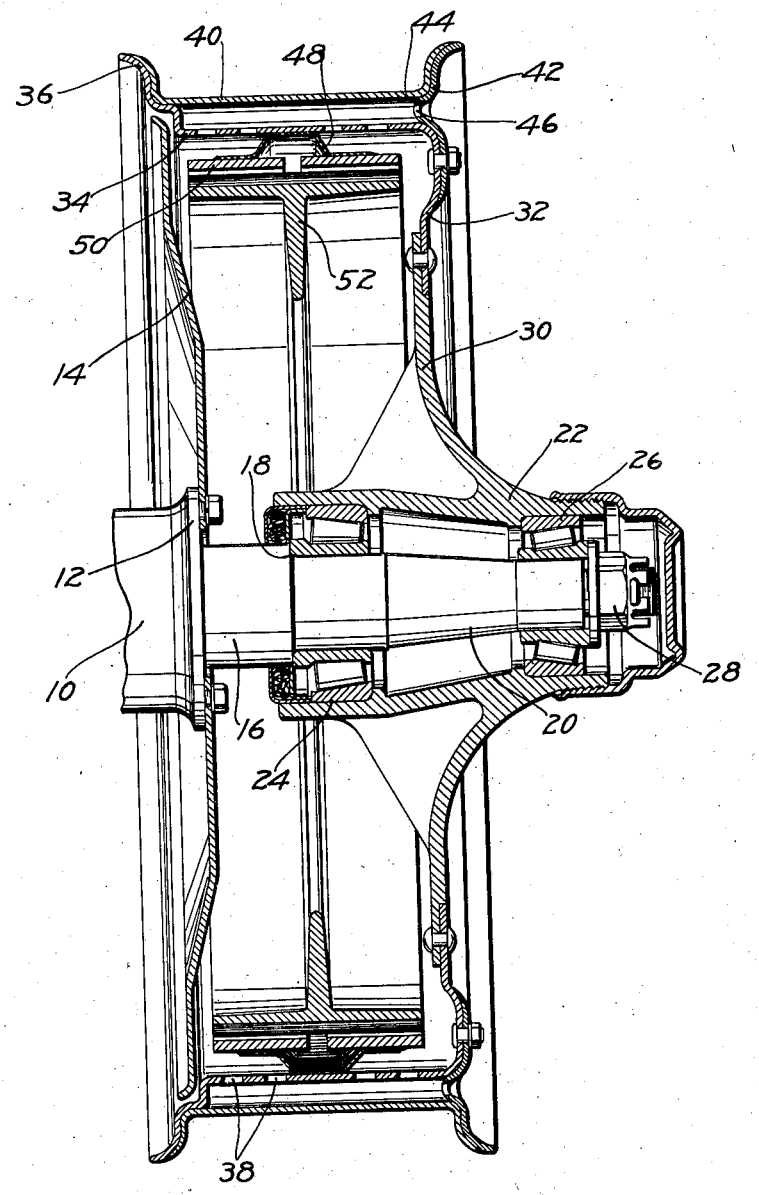
INVENTOR.
VICTOR W. KLIESRATH
BY O. H. Fowler
ATTORNEY Patented Nov. 26, 1935

2,022,041

UNITED STATES PATENT OFFICE 2,022,041

WHEEL

Victor W. Kliesrath, South Bend, Ind., assignor to Bendix Aviation Corporation, South Bend, Ind., a corporation of Delaware Application April 29, 1932, Serial No. 608,283

1 Claim. (Cl. 301—6)

This invention relates to wheels and more particularly to wheels for use with low pressure tires.

Broadly, the invention comprehends a wheel comprising a hub having a flange supporting a radial load carrying disc provided with a rim arranged to support an auxiliary rim. The rim and the auxiliary rim are arranged in spaced relation to provide an annular ventilating space between them. Ventilation is effected through suitable openings in the rim communicating with the annular ventilating space and through louvers in a detachable retaining flange secured to the radial load carrying disc for supporting the auxiliary rim.

The structure further contemplates a highly desirable brake drum including two or more rings or bands supported by a resilient means secured to the inner periphery of the rim. It has been found that brake drums of this particular structure may readily become self-adjusting and self-aligning, and this is an important factor.

An object of the invention is to provide a wheel structure including a rim and an auxiliary rim arranged in spaced relation and means for ventilating the space between the rim and the auxiliary rim.

Another object of the invention is to provide a wheel structure including a self-adjusting and self-aligning brake drum.

A feature of the invention is a radial load carrying disc having a rim, an auxiliary rim supported thereby in spaced relation thereto, and a detachable retaining ring for the auxiliary rim having means for supporting the auxiliary rim and directing currents of air between the rim and the auxiliary rim.

Another feature of the invention is a wheel having a rim, and a drum including a plurality of bands resiliently supported on the rim of the wheel.

Other objects and features of the invention will appear from the following description taken in connection with the drawing, which forms a part of this specification, and in which:

The drawing is a vertical sectional view of a wheel illustrating the various parts that go to make up the present invention.

Referring to the drawing for more specific details of the invention, 10 represents an axle housing having the conventional flange 12 to which is bolted or otherwise secured a backing plate or dust shield 14. This structure which may be of any preferred type constitutes no part of the present invention.

An axle 16 supported in the axle housing 10 has formed thereon a shoulder 18 and a spindle 20. This spindle has positioned thereon for rotation a wheel embodying the invention. As shown, the wheel includes a hub 22 having suitable bearings 24 and 26. The bearing 24 engages the shoulder 18 on the spindle, and the bearing 26 engages a retaining nut 28 threaded on the end of the spindle.

The hub of the wheel has formed integral therewith a radial flange 30, to which is suitably secured a radial load carrying disc 32 provided with a rim 34 having a retaining flange 36. The rim 34 is apertured as indicated at 38, the object of which will hereinafter appear. An auxiliary rim 40 is supported in spaced relation to the rim 34 to provide an annular ventilating space. The auxiliary rim is supported by the retaining flange 36 and a detachable retaining flange 42 secured on the disc 32. The detachable retaining flange has a bead 44 fitting snugly between the rim and the auxiliary rim and louvers 46 are arranged in the beaded portion of the detachable retaining flange.

The louvers function as fan blades which cause rapid circulation of air through the annular space between the rim 34 and the auxiliary rim 40 to effectively cool these elements, and in addition thereto force currents of air through the openings 38 to circulate about the drum and to effectively cool the same.

The rim has secured on its inner periphery a cushion in the form of a flexible channelled member 48 to which is suitably secured a drum including corresponding rings or bands 50 adaptable for cooperation with a suitable friction element 52. The supporting means for the bands is such that the bands may readily become self-adjusting and self-aligning; hence, more efficient cooperation with the friction element.

Although this invention has been described in connection with certain specific embodiments, the principles involved are susceptible of numerous other applications that will readily occur to persons skilled in the art. The invention is, therefore, to be limited only as indicated by the scope of the appended claim.

Having thus described the various features of the invention what I claim as new and desire to secure by Letters Patent, is:

A wheel comprising a radial load carrying disc, a lateral extending rim on the disc having radial perforations and a retaining flange, a detachable retaining flange on the disc, an auxiliary rim supported by the flanges in spaced relation to the rim, louvers in the detachable retaining flange communicating with the space between the rims, a brake means spaced from the inner periphery of said laterally extending rim and means to secure said brake means in said spaced relation.

VICTOR W. KLIESRATH.